(12) United States Patent
Subramanian et al.

(10) Patent No.: US 12,145,394 B2
(45) Date of Patent: Nov. 19, 2024

(54) ULTRASONIC BONDING OF SECURITY DEVICE TO A SUBSTRATE TO PREVENT HARVESTING

(71) Applicant: Crane & Co., Inc., Dalton, MA (US)

(72) Inventors: Pazam Subramanian, Hollis, NH (US); Eric M. Ziegler, Lexington, MA (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 17/757,817

(22) PCT Filed: Dec. 9, 2020

(86) PCT No.: PCT/US2020/064115
§ 371 (c)(1),
(2) Date: Jun. 21, 2022

(87) PCT Pub. No.: WO2021/133555
PCT Pub. Date: Jul. 1, 2021

(65) Prior Publication Data
US 2023/0012627 A1    Jan. 19, 2023

Related U.S. Application Data

(60) Provisional application No. 62/953,134, filed on Dec. 23, 2019.

(51) Int. Cl.
*B42D 25/45* (2014.01)
*B42D 25/29* (2014.01)
(Continued)

(52) U.S. Cl.
CPC .......... *B42D 25/324* (2014.10); *B42D 25/29* (2014.10); *B42D 25/351* (2014.10);
(Continued)

(58) Field of Classification Search
CPC ..... B42D 25/45; B42D 25/455; B42D 25/351
See application file for complete search history.

(56) References Cited

U.S. PATENT DOCUMENTS 5,090,736 A * 2/1992 Minkus ................. B42D 25/23
283/77
6,213,702 B1    4/2001 Wesselink
(Continued)

FOREIGN PATENT DOCUMENTS

DE    102008031653 A1 *  1/2010 ........... B44B 5/0066
DE    102012213913 A1    2/2014
(Continued)

OTHER PUBLICATIONS

WO-2011061203-A1 English Translation (Year: 2011).*
(Continued)

*Primary Examiner* — Kyle R Grabowski

(57) ABSTRACT

A security document (200) includes a substrate (205) having a first surface and a second surface opposite to the first surface, the first surface having a cellulosic material. The security document further includes an optical security device (220) having optical indicia of authenticity of the security document and a third surface, the third surface having a thermoplastic polymer. The security document also includes an ultrasonic weld (225) forming a bond between a section of the first surface and a section of the third surface.

9 Claims, 7 Drawing Sheets

(51) Int. Cl.
*B42D 25/324* (2014.01)
*B42D 25/351* (2014.01)
*B42D 25/355* (2014.01)
*B42D 25/455* (2014.01)
*B42D 25/46* (2014.01)

(52) U.S. Cl.
CPC ........... *B42D 25/355* (2014.10); *B42D 25/45* (2014.10); *B42D 25/455* (2014.10); *B42D 25/46* (2014.10)

(56) References Cited

U.S. PATENT DOCUMENTS

| | | | |
|---|---|---|---|
| 8,062,445 | B2 | 11/2011 | Kian |
| 2011/0019283 | A1 | 1/2011 | Steenblik et al. |
| 2011/0248492 | A1 | 10/2011 | Kittredge et al. |
| 2016/0229215 | A1 | 8/2016 | Prett et al. |
| 2018/0229536 | A1* | 8/2018 | Gettens ............... B42D 25/45 |
| 2018/0247170 | A1 | 8/2018 | Ziegler |

FOREIGN PATENT DOCUMENTS

| | | | | |
|---|---|---|---|---|
| DE | 102014217716 A1 | | 3/2016 | |
| EP | 2479038 A1 | * | 7/2012 | ............ B29C 65/02 |
| EP | 3360692 A1 | * | 8/2018 | ............... B42C 1/00 |
| FR | 3033524 A1 | * | 9/2016 | |
| JP | 2000246817 A | | 9/2000 | |
| JP | 2008188865 A | | 8/2008 | |
| JP | 2014200967 A | | 10/2014 | |
| RU | 2233748 C2 | | 8/2004 | |
| WO | WO-2011061203 A1 | * | 5/2011 | ............ B29C 65/00 |
| WO | WO-2020057960 A1 | * | 3/2020 | ............ B42D 25/24 |

OTHER PUBLICATIONS

FR-3033524-A1 English Translation (Year: 2016).*
WO-2020057960-A1 English Translation (Year: 2020).*
International Search Report and Written Opinion of the International Searching Authority dated Apr. 29, 2021, in connection with International Application No. PCT/US2020/064115, 16 pages.
Search Report dated Apr. 3, 2024, in connection with Brazilian Application No. BR112022012454-6, 8 pages.
Supplementary European Search Report dated Jun. 6, 2024, in connection with European Application No. 20904631.7, 15 pages.
Official Action of Substantive Examination dated Feb. 19, 2024, in connection with Russian Application No. 2022118830, 15 pages.
Communication pursuant to Rule 164(1) EPC, dated Jan. 8, 2024, in connection with European Application No. 20904631.7, 13 pages.
Notice on the Result of Substantive Examination, dated Jan. 17, 2024, in connection with Indonesian Application No. P00202207636, 7 pages.
Notice of Reasons for Refusal dated Sep. 17, 2024, in connection with Japanese Application No. 2022-539079, 11 pages.

* cited by examiner

ULTRASONIC BONDING OF SECURITY DEVICE TO A SUBSTRATE TO PREVENT HARVESTING

CROSS-REFERENCE TO RELATED APPLICATION(S)

This application is a 371 National Stage of International Application No. PCT/US2020/064115, filed Dec. 9, 20200, which claims priority to U.S. Provisional Application No. 62/953,134, filed Dec. 23, 2019, the disclosures of which are incorporated herein by reference in their entirety.

TECHNICAL FIELD

The present disclosure relates to enhancing the resistance of security documents against harvesting of security devices to produce counterfeit documents. More specifically, this disclosure relates to ultrasonic bonding of a security device to a substrate to prevent harvesting.

BACKGROUND

Hardening passports, banknotes and other documents (referred to herein as "security documents") whose constructional features include hard-to-reproduce indicia of the documents' authenticity against counterfeiting remains an ongoing source of technical challenges and opportunities for improvement in the field of security document design. "Harvesting," whereby malicious actors break down (for example, through prolonged soaking of the document in water or another solvent) an authentic security document in order to remove hard-to-reproduce components of the security document intact provides a mechanism by which malicious actors can obtain materials to produce counterfeit security documents. If removed substantially intact, hard-to-reproduce components of security documents, such as optical security devices (for example, security strips and patches) can, for example, be used to create up-cycled counterfeits (for example, by incorporating the security thread from a lower denomination banknote into a forgery of a higher denomination banknotes), or multiple counterfeits (for example, by using pieces of an embedded security thread from an authentic banknote to produce two counterfeit notes). While counterfeit security documents produced from harvested components can typically be identified by central banks and security document professionals, to the extent they provide visible indicia of authenticity which substantially matches those of authentic documents, such counterfeits are of serviceable quality to malicious actors in that they can readily pass for authentic security documents to everyday users.

SUMMARY

The present disclosure illustrates embodiments of ultrasonic bonding of a security device to a substrate to prevent harvesting.

In a first embodiment, a security document includes a substrate having a first surface and a second surface opposite to the first surface, the first surface including a cellulosic material. The security document also includes an optical security device having optical indicia of authenticity of the security document and a third surface, the third surface including a thermoplastic polymer. Additionally, the security document includes an ultrasonic weld forming a bond between a section of the first surface and a section of the third surface.

In a second embodiment, a method of making a security document includes positioning an optical security device on a first surface of a substrate, wherein the substrate has the first surface and a second surface opposite to the first surface, and the first surface includes a cellulosic material. Further, the optical security device has optical indicia of authenticity of the security document and a third surface, the third surface including a thermoplastic polymer. The method includes pinching the optical security device and the substrate together at a predetermined clamping pressure applied by an ultrasonic probe and a mold, and while the optical security device and substrate are pinched together, applying for a predetermined welding time, vibrational energy through the ultrasonic probe to produce an ultrasonic weld bonding a section of the first surface to a section of the third surface.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged security document.

Although the present disclosure has been described with various embodiments, various changes and modifications may be suggested to one skilled in the art. It is intended that the present disclosure encompass such changes and modifications as falling within the scope of the claims.

Figure 1:
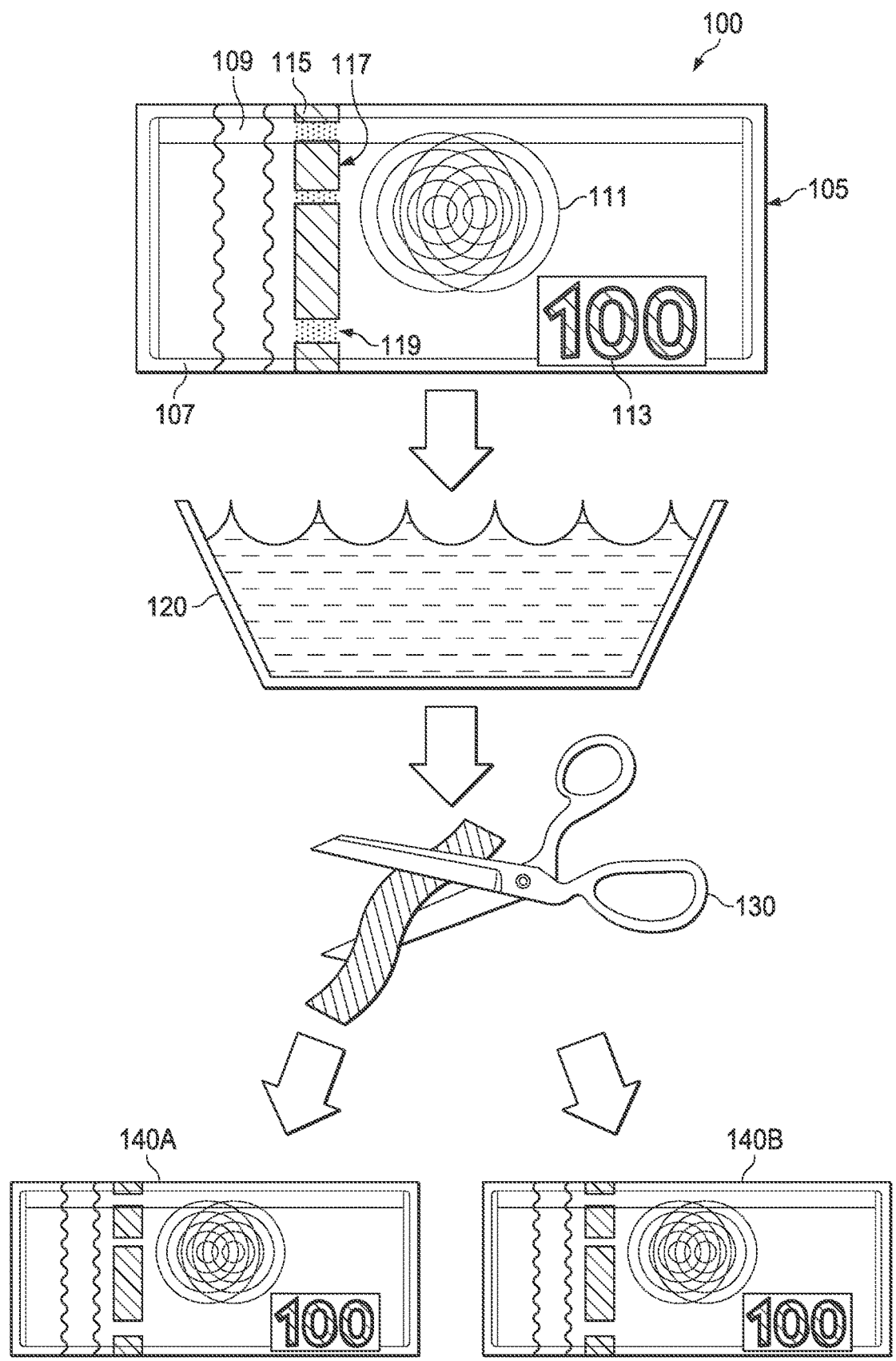
FIG. 1 illustrates, by way of background, an example of harvesting of an embedded security device in an authentic security document to produce two counterfeit security documents of serviceable quality for malicious actors.

By way of background and exposition of at least one technical problem addressed by certain embodiments according to this disclosure, FIG. 1 illustrates an example 100 of a mechanism by which security features of one authentic security document 105 (in this example, a banknote) can be harvested and used to produce two counterfeit security documents of serviceable quality to malicious actors.

Referring to the example of FIG. 1, an example of a security document 105 is provided. As shown in the figure, security document 105 comprises a substrate 107 incorporating a plurality of constructional features which provide visible and invisible indicia of the authenticity of security document 105. Examples of constructional features which provide invisible indicia of the document's authenticity include, without limitation, magnetic inks or machine readable features (for example, radio frequency identification ("RFID")) antenna attached to, or embedded in, substrate 107.

Examples of constructional features which provide visible indicia of authenticity include watermarks, printed effects, specialty inks, and security devices formed in, applied to, or embedded in substrate 107. In this illustrative example, the constructional features of security document 105 which provide visible indicia of authenticity include a watermark 109, which in some embodiments, is formed through the use of a patterned dandy roll during the manufacture of the paper of substrate 107. Further examples of constructional features of security document 105 which provide visual indicia of authenticity include intaglio design 111, which comprises a hard-to-reproduce pattern of lines, which due to the fine resolution of the pattern and use of intaglio printing techniques, produces a characteristic moiré interference effect, and has a distinctive surface texture. In this illustrative example, the constructional features of security document 105 which provide visual indicia of the document's authenticity include areas 113 printed with specialized, hard-to-obtain inks, such as optically variable inks or color shifting inks, whose appearance changes in response to changes in the angle of incidence of light hitting the ink. Constructional features which provide visible indicia of the authenticity of security document 105 can also include security devices 115. In some embodiments, security device 115 comprises a section of thin material (for example, a narrow ribbon of a polymer substrate) supporting one or more arrays of micro- or nano-scale optical structures, for example, lenses, icon structures, or diffraction gratings, which, collectively produce a distinctive optical effect. Examples of such optical effects include, without limitation, a moiré magnification effect (sometimes referred to as a "synthetically magnified image" or a "synthetic image"), a color shift, or a hologram.

Improvements in imaging and printing technology, as well as criminal resourcefulness, have provided malicious actors with the ability and materials to produce counterfeit security documents embodying serviceable facsimiles of many of the above-described constructional features which provide visible indicia of security documents' authenticity, with the principal exception being security devices 115. Given the tiny scale of the optical structures in security devices 115, and the institutional controls on certain of the tools, materials and technology involved in the production of security devices 115, most malicious actors do not presently have the means or technical know-how to produce counterfeits of security devices 115.

As a work-around to not being able to reproduce security device 115, malicious actors looking to produce counterfeit security documents "harvest" security devices from an authentic document to be incorporated into one or more counterfeit security documents. Referring to the explanatory example of FIG. 1, security device 115 is a micro-optic thread spanning the width of security document 100. As shown in the figure, security device 115 is embedded into substrate 107 such that portions of security device 115 are visible through windows 117 in the substrate, and other portions of security device are concealed by bridges 119.

Referring to the explanatory example of FIG. 1, malicious actors can, in certain cases, remove security device 115 substantially intact through prolonged soaking of security document 100 in a solvent (for example, water or bleach) to release the adhesive bond between security device 115 and substrate 107 or break down substrate 107. Once removed substantially intact, security device 115 can be carefully cut 130 into pieces which can be affixed to the surface of a plurality of counterfeit substrates 140a and 140b, or alternatively, to the surface of an embedded carrier thread to create, from an initial number of authentic security documents, a larger number of counterfeit documents, which, though not perfect copies of security document 105, carry sufficient visual indicia of authenticity to be easily circulated and mistaken for authentic documents by many users.

While not discussed in the explanatory example of FIG. 1, other methods of producing counterfeit security documents can be enabled by harvesting security device 115 substantially intact. For example, once harvested, security device 115 may be up-cycled to produce a counterfeit banknote of a higher denomination than security document 105, or in some cases, multiple counterfeit banknotes of the same denomination. Alternatively, in cases where a security document is an identification document, or otherwise associated with an authorized actor, harvesting security device 115 substantially intact can facilitate the creation of a counterfeit security document associated with an unauthorized actor (for example, to create a fake passport).

Figure 2A:
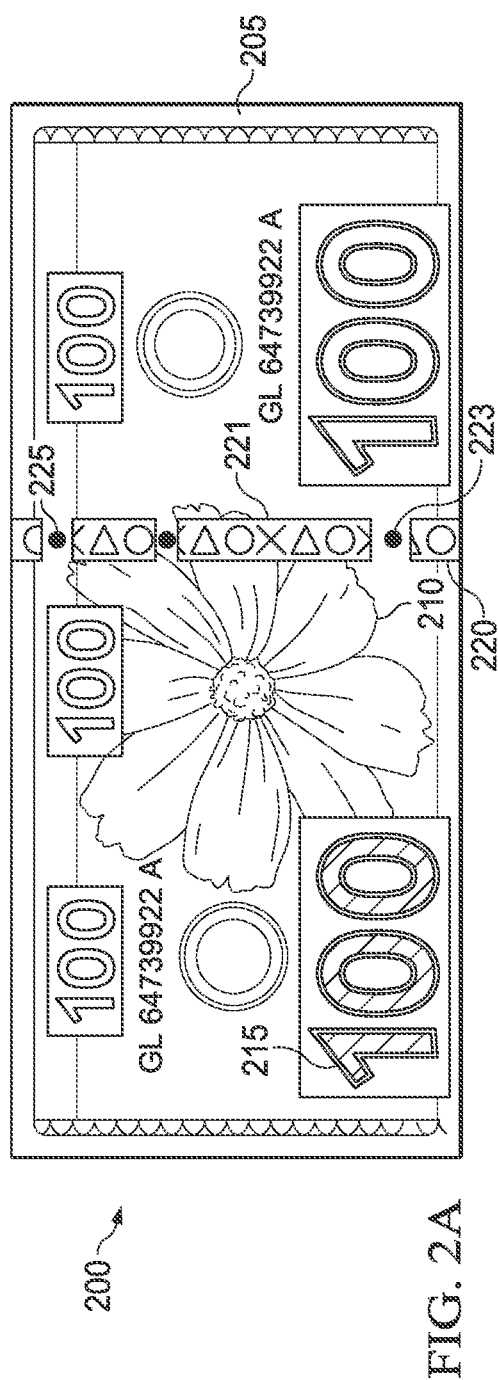
FIGS. 2A and 2B illustrate two examples of security documents according to various embodiments of this disclosure.
Figure 2B:
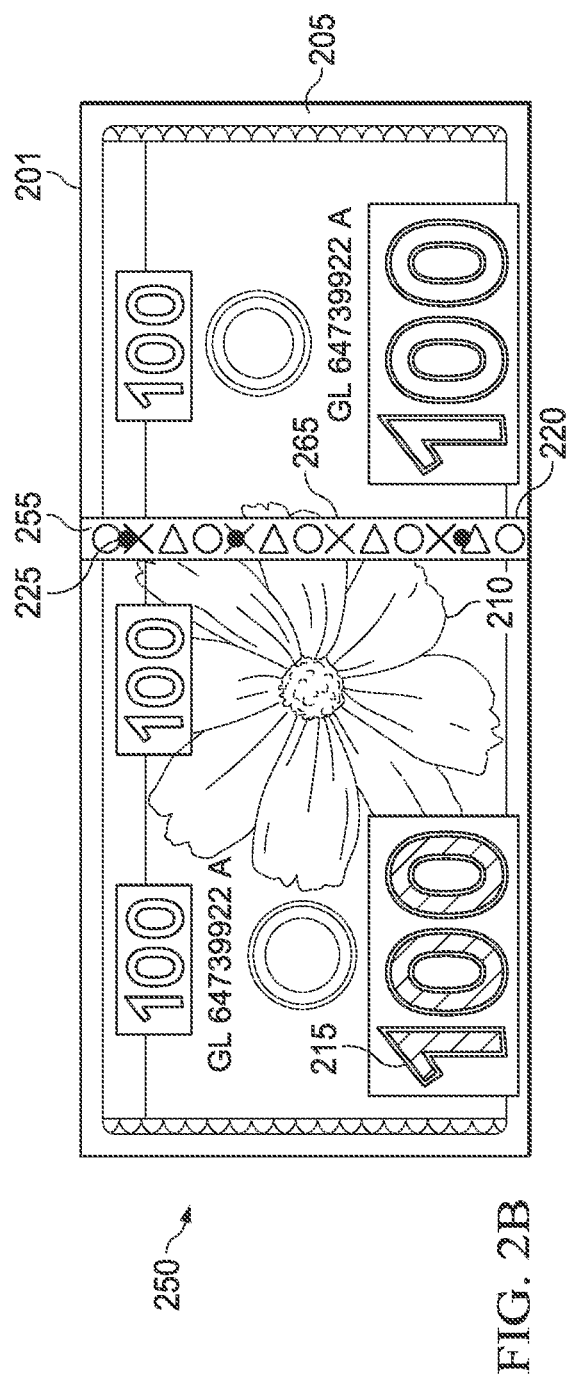

FIGS. 2A and 2B illustrate two examples of security documents according to various embodiments of this disclosure. For convenience, structural elements common to the examples of FIGS. 2A and 2B are numbered similarly.

As discussed with respect to the explanatory example of FIG. 1, one of the operative premises behind harvesting security devices from authentic security documents is that the security device can not only be separated from the substrate of the authentic document, but separated in a substantially intact condition suitable for reuse in a counterfeit document. Advantageously, and as discussed further herein, certain embodiments according to this disclosure undermine this operative premise by strengthening the bond between the security device and substrate (thereby decreasing the likelihood of successful separation), and by strategically altering or damaging portions of the security device (thereby increasing the likelihood that if harvested, the security device will be unsuitable for use in a counterfeit document).

Referring to the non-limiting example of FIG. 2A, an example of a security document 200 according to various embodiments of this disclosure is shown. According to some embodiments, security document 200 comprises a substrate 205, which comprises a first surface and a second surface. In some embodiments (for example, embodiments without window and bridge regions in substrate) the first surface comprises an exterior side of substrate 205. In certain embodiments, (for example, embodiments with bridge regions in substrate 205) the first surface is an interior surface of substrate 205.

According to various embodiments, first surface 201 comprises a cellulosic material. In certain embodiments, the cellulosic material of first surface 201 is a cellulosic material used to form the entirety of substrate 205. For example, substrate 205 may be made of paper formed on a Fourdrinier machine, and the cellulosic material on first surface 201 is derived from the pulp or fibrous slurry used to make the body of the substrate. In some embodiments, the first surface comprises a cellulosic outer layer of a multi-layer substrate structure. According to various embodiments, the cellulosic material is, without limitation, one or more of wood pulp, cotton fiber, linen fiber, flax fiber, sisal fiber, hemp fiber, Abaca fiber, Kozo fiber, Mitsumata fiber, bamboo fiber or Kenaf fiber.

As shown in the non-limiting example of FIG. 2A, the constructional features of security document 200 include one or more elements which provide visual indicia of the authenticity of security document. In this illustrative example, elements providing visual indicia of authenticity include, without limitation, printed design 210 (for example, intaglio design 111 in FIG. 1), areas 215 printed with optically variable ink (OVI) (for example, areas 113 in FIG. 1), and optical security device 220 (for example, security device 115 in FIG. 1 or optical security device 300 in FIG. 3).

Referring to the non-limiting example of FIG. 2A, optical security device 220 is a thin, continuous strip which comprises micro-scale structures providing optical indicia of the authenticity of security document 200. In this illustrative example, optical security device 220 is both embedded in, and affixed to substrate 205, and is outwardly visible in one or more window regions (for example, window region 221), and not outwardly visible in one or more bridge regions (for example, bridge region 223). In certain embodiments, optical security device 220 comprises a third surface, comprising a thermoplastic polymer. Examples of suitable thermoplastic polymers include, without limitation, polyester, polypropylene and polyethylene terephthalate ("PET").

Figure 3:
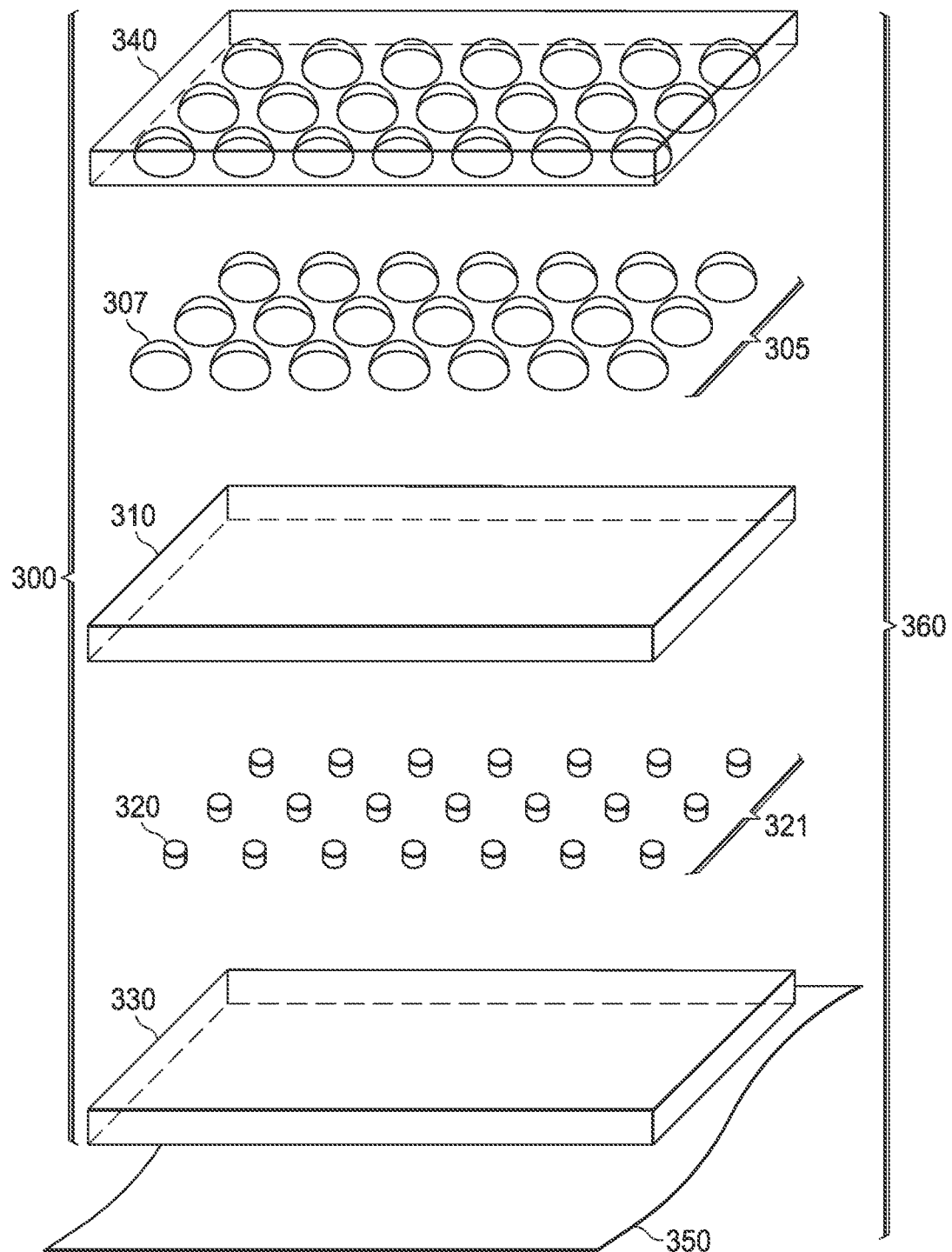
FIG. 3 illustrates an example of a section of an optical security device, which is incorporated in a security document, according to certain embodiments of this disclosure.

In some embodiments, the third surface of optical security device 220 is a seal layer of a micro-optic security device (for example, seal layer 340 in FIG. 3). In various embodiments, (for example, micro-optic systems which do not have a seal layer), the third surface is a layer of focusing elements (for example, array of focusing elements 305 in FIG. 3). In some embodiments, the third surface is an image icon layer (for example, arrangement of image icons 320 in FIG. 3). In one or more embodiments, the third surface is a substrate of the optical security device 220 (for example, second substrate 330 in FIG. 3). According to various embodiments, optical security device 220 is embedded in substrate 205 as part of a roll-to-roll papermaking process used to form substrate 205 from a fibrous slurry. In certain embodiments, at least one side of optical security device 220 is bonded to an interior or exterior surface of substrate 205 with an adhesive.

Surprisingly and advantageously, the inventors of the present disclosure have discovered that certain optical security devices (for example, micro-optic threads) suitable for use in security documents can be ultrasonically welded to the cellulosic material on one or more surfaces of a security document substrate. As such, in certain embodiments according to this disclosure, ultrasonic welds (for example, ultrasonic weld 225) bond one or more thermoplastic surfaces of optical security device 220 to one or more surfaces of substrate 205 comprising cellulosic material. As discussed in detail elsewhere in this disclosure, such ultrasonic welds combat harvesting in at least the following regards. First, they provide a further mechanism for attaching optical security device 220 to substrate 205, making it harder to separate optical security device 220 from substrate 205. Second, the process of ultrasonically welding optical security device 220 to substrate 205 can be performed in a way that, even if separated from substrate 205, optical security device 220 is visibly altered in a way that makes it unsuitable for use in counterfeit security documents.

FIG. 2B illustrates an example of a security document 250 according to various embodiments of this disclosure.

Referring to the non-limiting example of FIG. 2B, security document 250 differs structurally from security document 200 in FIG. 2A in that, rather than being embedded in bridge regions of substrate 205, optical security device 220 is surface mounted on an exterior first surface 201 of substrate 205. As noted elsewhere in this disclosure, depending on certain welding parameters (for example, the clamping pressure applied to the security document by an ultrasonic probe and a mold), the optical security device can be altered or damaged (in the sense that the device's ability to provide an optical effect in the area of the ultrasonic weld is degraded or negated) during the creation of an ultrasonic weld. Referring to the non-limiting example of FIG. 2B, optical security device 220 comprises image regions (for example, image region 255), which contain small scale optical structures (for example, micro-lenses or ridges of a diffraction grating) producing one or more optical effects providing optical indicia of the authenticity of security document 250. As shown in this illustrative example, optical security device 220 comprises transition regions 265, which, in some embodiments, do not contain the small scale optical structures producing the optical effects providing optical indicia of the authenticity of security document 250. While not shown in the non-limiting example of FIG. 2, in certain embodiments, transition regions 265 comprise micro-optic structures which merely provide "white space" in an optical effect provided by the optical security device 220. In the illustrative example of FIG. 2B, the ultrasonic welds (for example, ultrasonic weld 225) register with the transition regions, which as discussed elsewhere herein, facilitates applying a higher clamping force during ultrasonic welding. Depending on embodiments, and the welding apparatus used, applying a higher clamping force can produce creating stronger bonds between substrate 205 and optical security device 220, as well as enhance the functionality of security document 250 by creating tactile indicia of authenticity (for example, a signature pattern of bumps or braille text) in the security document.

FIG. 3 illustrates an example of a section of an optical security device 300, which is incorporated in a security document 360, according to certain embodiments of this disclosure.

Referring to the non-limiting example of FIG. 3, optical security device 300 comprises, a plurality of focusing elements 305 (including, for example, focusing element 307), and an arrangement of image icons 320 (including, for example, image icon 321). According to various embodiments, each focusing element of plurality of focusing elements 305 has a footprint, in which one or more image icons of arrangement of image icons 320 is positioned. Collectively, the focusing elements of plurality of focusing elements 305, magnify portions of image icons 320 to produce a moiré magnification effect (also referred to as a "synthetically magnified image" or more briefly, a "synthetic image") wherein the individually microscopic image icons are collectively magnified by the plurality of focusing elements 305 to produce an image which dynamically reacts (for example, by appearing to move, or change colors) in response to shifts in viewing angle. Given the small scale and tight manufacturing tolerances of the constituent structures of optical security device providing the moiré magnification effect, many malicious actors are not able to produce counterfeit versions of optical security device 300. Accordingly, optical security device 300 is, in many cases, a trusted visual indicia of a security document's (for example, security document 360) authenticity.

According to certain embodiments, plurality of focusing elements 305 comprises a planar array of micro-optic focusing elements. In some embodiments, the focusing elements of plurality of focusing elements 305 comprise micro-optic refractive focusing elements (for example, plano-convex or GRIN lenses). Refractive focusing elements of plurality of focusing elements 305 are, in some embodiments, produced from light cured resins with indices of refraction ranging from 1.35 to 1.7, and have diameters ranging from 5 µm to 200 µm. In various embodiments, the focusing elements of plurality of focusing elements 305 comprise reflective focusing elements (for example, very small concave mirrors), with diameters ranging from 5 µm to 50 µm. While in this illustrative example, the focusing elements of plurality of focusing elements 305 are shown as comprising circular plano-convex lenses, other refractive lens geometries, for example, lenticular lenses, are possible and within the contemplated scope of this disclosure.

As shown in the illustrative example of FIG. 3, arrangement of image icons 320 comprises a set of image icons (including image icon 321), positioned at predetermined locations within the footprints of the focusing elements of plurality of focusing elements 305. According to various embodiments, the individual image icons of arrangement of image icons 320 comprise regions of light cured material associated with the focal path of structured light (for example, collimated UV light) passing through plurality of focusing elements 305 from a projection point associated with one or more predetermined ranges of viewing angles. In some embodiments, the individual image icons of arrangement of image icons 320 are not provided within a structured image icon layer. As used in this disclosure, the term "structured image layer" encompasses a layer of material (for example, a light-curable resin) which has been embossed, or otherwise formed to comprise structures (for example, recesses, posts, grooves, or mesas) for positioning and retaining image icon material. According to various embodiments, the individual image icons of arrangement of image icons 320 are provided within a structured image layer, the structured image layer comprising one or more of voids, mesas, or posts, which act as retaining structures to hold micro- and nano-scale volumes of colored material.

As shown in the illustrative example of FIG. 3, in certain embodiments, optical security device 300 includes an optical spacer 310. According to various embodiments, optical spacer 310 comprises a film of substantially transparent material which operates to position image icons of arrangement of image icons 320 in or around the focal plane of focusing elements of plurality of focusing elements 305. In certain embodiments according to this disclosure, optical spacer 310 comprises a manufacturing substrate upon which one or more layers of light curable material can be applied, to form one or more of arrangement of image icons 320 or plurality of focusing elements 305.

According to various embodiments, optical security device 300 comprises one or more regions of light-cured protective material which occupy the spaces between the image icons of arrangement of image icons 320. In some embodiments, the arrangement of image icons 320 is first formed (for example, by selectively curing and removing liquid light-curable material on optical spacer 310), and then a layer of clear, light-curable material is applied to fill spaces between the image icons of arrangement of image icons 320 and then flood-cured to create a protective layer, which protects the image icons from being moved from their positions within the footprints of focusing elements of plurality of focusing elements 305. In certain embodiments, the light-curable material used to form arrangement of image icons 320 is a pigmented, ultraviolet (UV)-curable polymer.

In some embodiments, arrangement of image icons 320 is affixed to a second substrate 330, which operates to protect and secure arrangement of image icons 320, and provide an interface for attaching optical security device 300 to a substrate 350 (for example, substrate 205 in FIG. 2A) as part of security document 360.

In certain embodiments according to this disclosure, optical security device 300 comprises a seal layer 340. According to certain embodiments, seal layer 340 comprises a thin (for example, a 2 µm to 50 µm thick layer) of substantially clear material which interfaces on a lower surface, with focusing elements of the plurality of focusing elements 305, and comprises an upper surface with less variation in curvature (for example, by being smooth, or by having a surface whose local undulations are of a larger radius of curvature than the focusing elements) than the plurality of focusing elements 305. According to various embodiments, the upper surface of seal layer 340 is formed from a thermoplastic material which can be ultrasonically welded to a surface comprising a cellulosic material.

As shown in the non-limiting example of FIG. 3, in certain embodiments, optical security device 300 can be attached to substrate 350, to form a security document 360.

According to various embodiments, substrate 350 comprises a sheet of material with at least one surface comprising cellulosic material, such as wood pulp, cotton fiber, linen fiber, flax fiber, sisal fiber, hemp fiber, Abaca fiber, Kozo fiber, Mitsumata fiber, bamboo fiber or Kenaf fiber.

While FIG. 3 provides one example of an optical security device 300 according to various embodiments, the present disclosure is not so limited. Other optical security devices which comprise at least one surface with a thermoplastic polymer, and include hard-to-reproduce micro- and nano-scale optical structures (for example, holograms, devices providing thin-film effects, devices producing diffraction-based optical effects) which provide harvesting targets for malicious actors are within the contemplated scope of this disclosure.

Figure 4A:
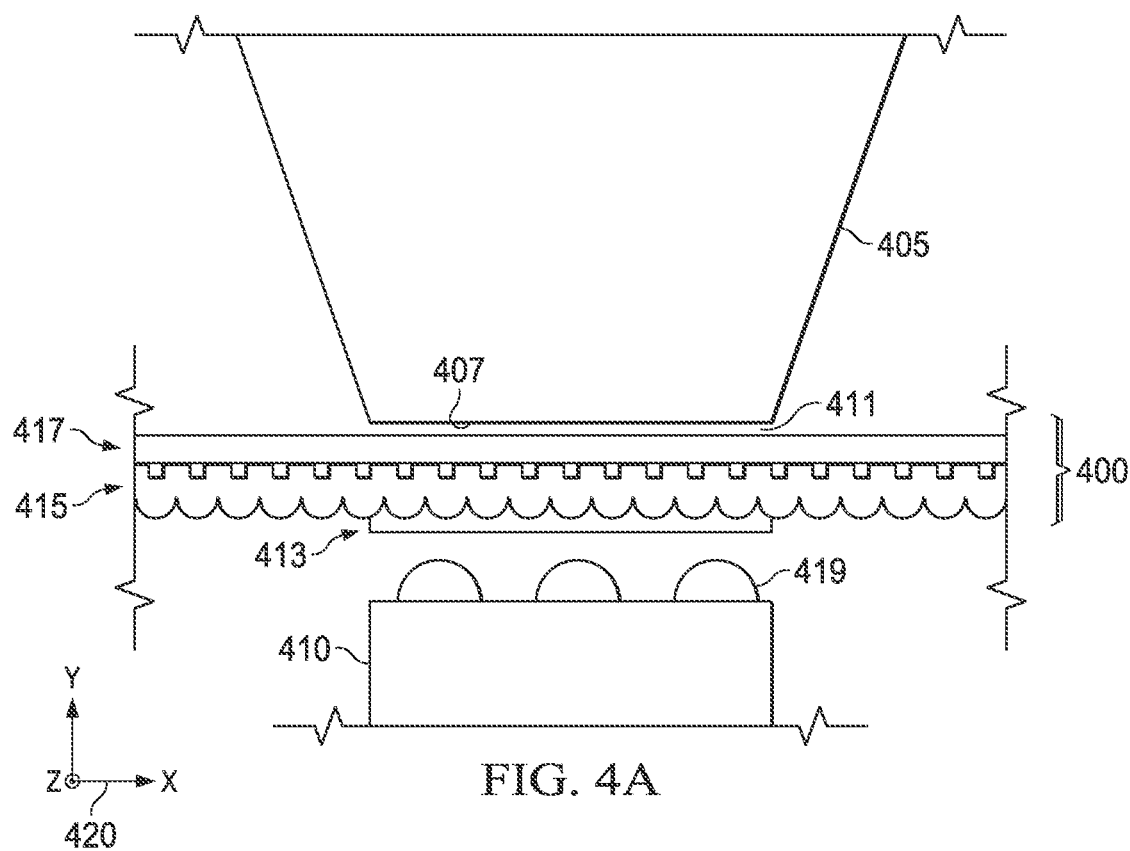
FIGS. 4A and 4B illustrate aspects of examples of security documents according to certain embodiments of this disclosure, as well as examples of methods for manufacturing security documents according to some embodiments of this disclosure.
Figure 4B:
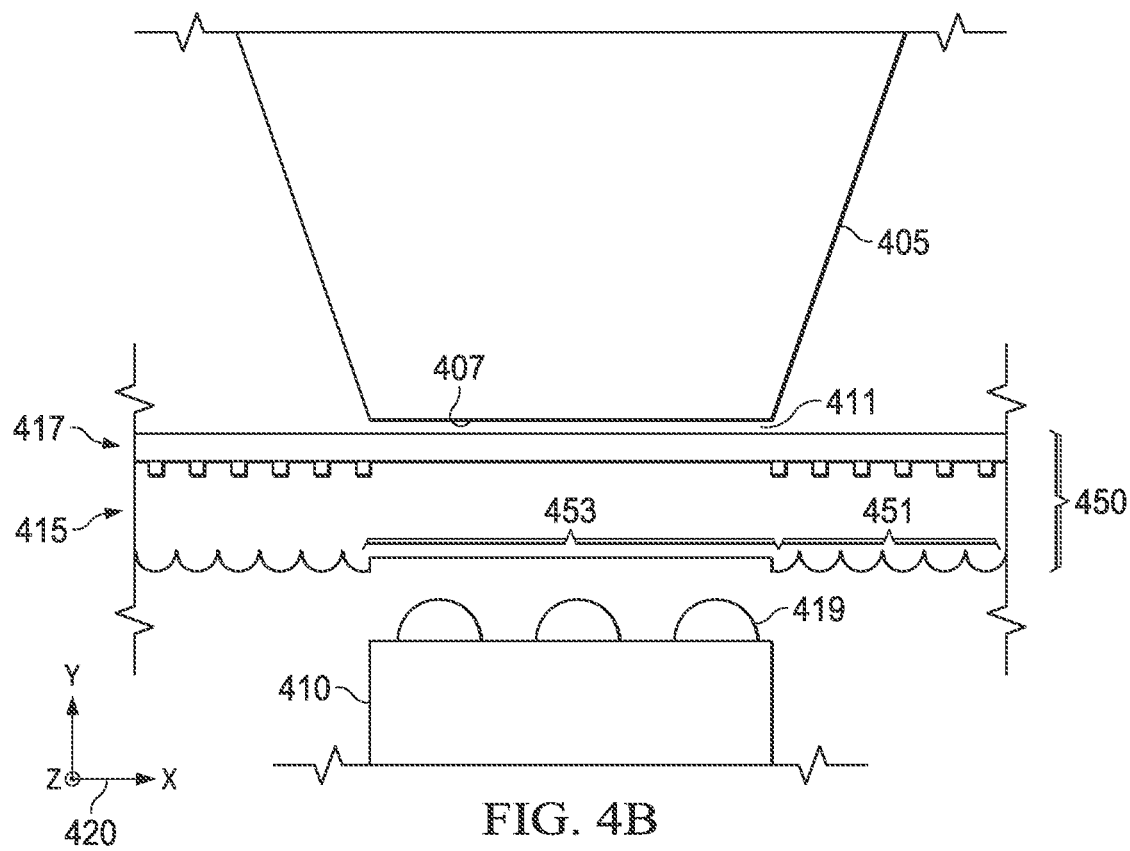

FIGS. 4A and 4B illustrate aspects of examples of security documents according to certain embodiments of this disclosure, as well as examples of methods for manufacturing security documents according to some embodiments of this disclosure. For convenience, elements common to the examples of FIGS. 4A and 4B are numbered similarly in the figures.

Certain security documents, including, without limitation, banknotes and identification documents, are produced in large volumes on high capacity roll-to-roll machines, such as papermaking machines and printing presses, which can have web speeds on the order of five hundred (500) feet per minute. Advantageously, ultrasonic welds for enhancing security documents' resistance to harvesting of security devices (for example, ultrasonic weld 225 in FIGS. 2A and 2B) according to certain embodiments of this disclosure can be formed in sub-second time frames. Because ultrasonic welding according to some embodiments of this disclosure can be performed in the limited time frame during which a fast-moving web passes through a section of a roll-to-roll processing machine, methods of ultrasonically bonding security devices to a substrate according to this disclosure are compatible with the high speed manufacturing techniques used in the production of security documents.

Referring to the illustrative example of FIG. 4A, a head-on view of a section of security document 400 passing between an ultrasonic probe 405 and a mold 410 of an ultrasonic welder is provided. As indicated by coordinate axes 420, in certain embodiments, security document 400 is part of a moving web (in this case, a web moving towards a viewer along the z-axis of coordinate axes 420).

According to certain embodiments, security document 400 comprises a bridge region (for example, bridge region 223 in FIG. 2), in which an optical security device 415 (for example, optical security device 300 in FIG. 3) interfaces with a substrate 417 (for example, substrate 350 in FIG. 3) on both a top side 413 of optical security device 415 and a bottom side 411 of the substrate.

As shown in the explanatory example of FIG. 4A, ultrasonic probe 405 comprises an ultrasonic stack configured to convert an electrical signal into a high frequency mechanical vibration of a lower surface 407 at an ultrasonic frequency. Examples of ultrasonic frequencies according to various embodiments of this disclosure include frequencies between 15-40 kilohertz (kHz). In some embodiments according to this disclosure, mold 410 comprises a patterned anvil, with one or more raised features 419 which define pinch points in which an ultrasonic weld between substrate 417 and one or more sides 411 and 413 of optical security device 415 is formed. According to various embodiments, security document 400 is pinched (for example, by a hydraulic press (not shown in the figure)) between bottom surface 407 and mold 410 at a predetermined clamping pressure. While pinched, ultrasonic probe 405 applies a vibrational energy to the pinched portion of security document 400 for a predetermined time. According to various embodiments, the predetermined time is between 0.5 to 1.0 seconds. In some embodiments, the predetermined time is between 0.3 and 0.5 seconds. In certain embodiments, the predetermined time is between 0.1 and 0.3 seconds. In various embodiments, the predetermined time is 0.2 seconds or less.

As discussed with reference to FIGS. 5 and 6A-6C of this disclosure, the clamping pressure applied to hold security document 400 between ultrasonic probe 405 and mold 410 is a parameter which can be tuned to reflect the overall design and manufacturing goals for security document 400. In certain embodiments, the design and manufacturing goals for the security document may specify that making the exterior surfaces of the security document be as smooth as possible outweighs maximizing the likelihood that a harvested security document is unfit for malicious reuse. Accordingly, in such embodiments, the predetermined clamping pressure may be lowered, to reduce the likelihood of the end product feeling "dented" by the ultrasonic welds. In some embodiments, ensuring that the security device, even if successfully harvested, is so visibly altered by the ultrasonic weld as to be unsuitable for malicious reuse is a higher priority than achieving perfect smoothness of the end product. In some embodiments, the design and manufacturing goals require visible alteration of the security device by the ultrasonic weld, and at the same time, specify minimizing, to the extent possible, "denting" the surface of the end product through application of a predetermined clamping force during ultrasonic welding.

In some embodiments according to this disclosure, the design and manufacturing goals for the end product can be met with a predetermined clamping pressure of 10 pounds per square inch (PSI) or even less. In certain embodiments, the design and manufacturing goals for the end product can be met with a predetermined clamping pressure between 10 and 20 psi. In various embodiments, the design and manufacturing goals for the end product can be met with a predetermined clamping pressure between 20 and 30 psi. Skilled artisans will appreciate that some experimentation is required to find a suitable clamping pressure for a given set of manufacturing and design parameters, as the geometry of the features 419 of mold 410 affects how the clamping force is applied and dispersed over the area of security document 400. For example, a mold having a plurality of closely spaced "dots" may produce a "bed of nails" effect, wherein the clamping pressure is distributed across a large number of points, and the clamping force at any one raised feature of the mold is not sufficient to significantly dent the end product. Similarly, other mold feature geometries, such as extrusions of a trapezoid with a high aspect ratio (for example, a mold feature shaped like a detached section of a KIT KAT® bar) may induce deformation of the substrate or security device at comparatively lower clamping pressures.

Referring to the non-limiting example of FIG. 4A, the combined action of applying vibrational energy to a pinched section of security document 400 causes the formation of ultrasonic welds bonding optical security device 415 to one or more of the bottom side 411 or top side 413 of substrate 417. According to various embodiments, the act of ultrasonically welding optical security device 415 to substrate 417 visibly alters the structure of optical security device 415 in a way that decreases its suitability for re-use. In some embodiments, ultrasonic welding crushes or otherwise structurally compromises micro-optic elements of optical security device 415, causing a portion of the security device to no longer provide an optical effect which acts as a visual signature, or indicia of security document 400's authenticity. In various embodiments, the predetermined clamping force deforms or separates (for example, by causing the "punched ticket" effect described with reference to FIGS. 5A through 5C of this disclosure) a portion of optical security device 415 in a way that makes it unfit for re-use.

While FIG. 4A illustrates of aspects of ultrasonically welding optical security device 415 within a bridge region of a substrate, embodiments according to this disclosure are not so limited. Specifically, FIG. 4B illustrates an example of aspects of creating an ultrasonic weld in a security document 450, wherein the optical security device 415 is disposed on the surface of substrate 417 in the area of the ultrasonic weld. Referring to the illustrative example of FIG. 4B, in certain embodiments, the apparatus for creating ultrasonic welds in a bridge region can be used to form ultrasonic welds in regions (including, for example, window region 221 in FIG. 2A) where the security device is surface mounted or otherwise comprises an exterior surface of the security document.

In certain embodiments, the design and manufacturing parameters of the end product require that, while the ultrasonic weld alter optical security device 415, it does not affect the micro-optic structures which produce the optical effect (s) which serve as indicia of security document 450's authenticity. Accordingly, in some embodiments, optical security device 415 comprises image regions 451, which contain optical microstructures (for example, focusing elements and image icons) which can be damaged from ultrasonic welding, and transition regions 453, which do not comprise the optical structures associated with the signature optical effect(s) of optical security device 415. In some embodiments, ultrasonic welding is performed in transition region 453, to achieve the compound objectives of securing optical security device 415 to substrate 417 in a way that diminishes optical security device's 417 suitability for malicious reuse, and at the same time, does not negatively affect the performance of the micro-optic structures in image region 451.

Figure 6A:
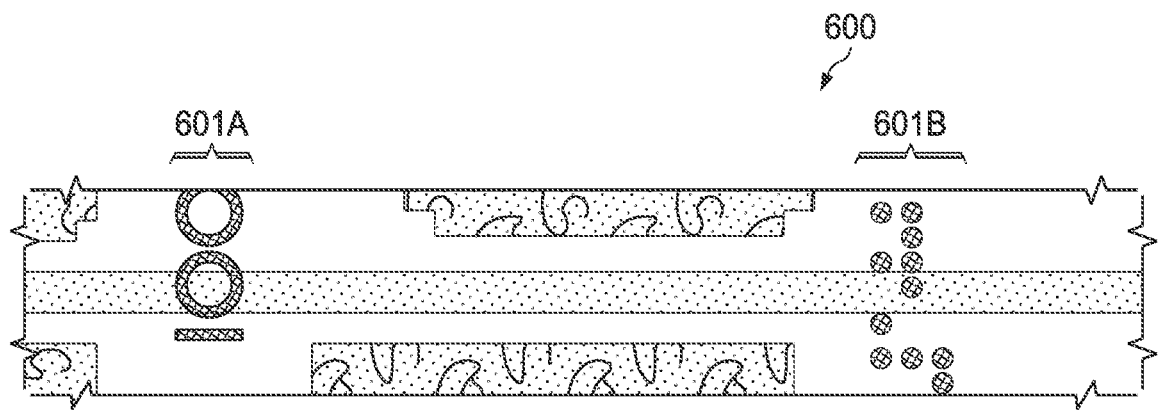
FIGS. 6A, 6B and 6C illustrate examples of tactile features formed in optical security devices by ultrasonic welding according to certain embodiments of this disclosure.
Figure 6B:
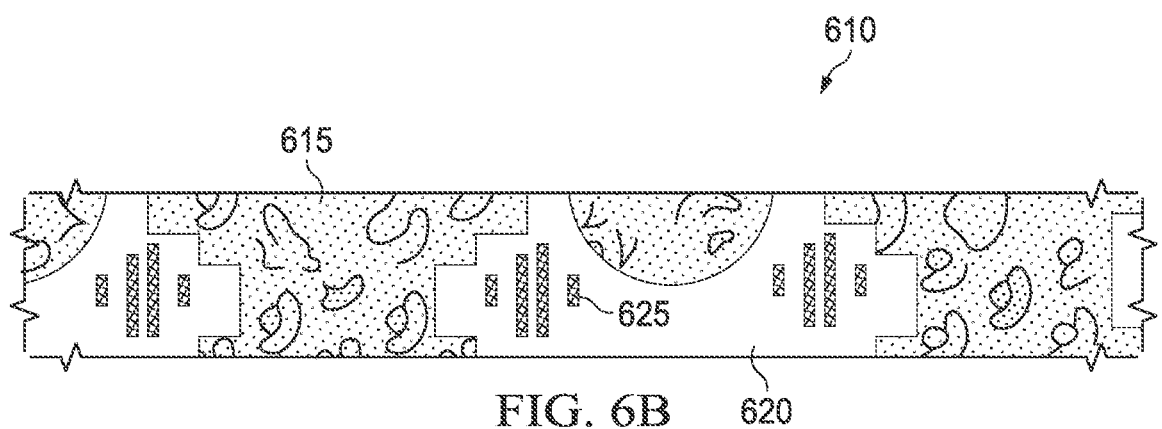
Figure 6C:
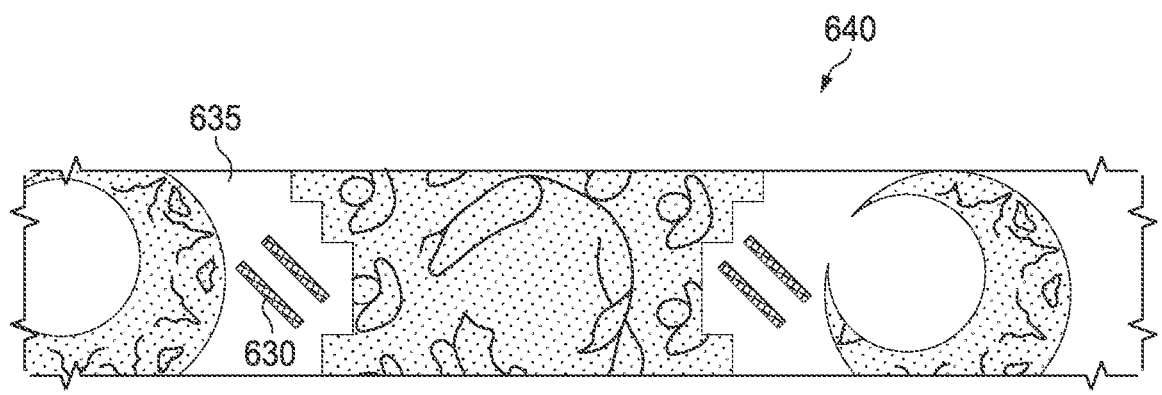

While FIG. 4B illustrates an example of ultrasonically welding optical security device 415 to substrate 417 in which security document 450 passes through the ultrasonic welding apparatus such that optical security device 415 faces mold 410 and substrate 417 faces lower surface 407 of ultrasonic probe 405, embodiments according to this disclosure are not so limited. In certain embodiments, security document 450 can be "flipped" relative to ultrasonic probe 405 and mold 410, such that features 419 of mold 410 contact substrate 417, and ultrasonic probe 405 contacts optical security device 415. According to various embodiments, and depending on the profile of mold 410, application of the predetermined clamping pressure creates "bumps," or raised features in optical security device 417. In some embodiments, the "bumps" or raised features created through the application of the predetermined clamping pressure provide tactile indicia of the authenticity of security document 450. According to some embodiments, the tactile indicia created through the clamping portion of the ultrasonic welding process, can be provided as one or more of bars (for example, as shown in FIGS. 6B and 6C of this disclosure), alphanumeric characters (for example, as shown in FIG. 6A of this disclosure) or braille characters (for example, as shown in FIG. 6A).

Figure 5A:
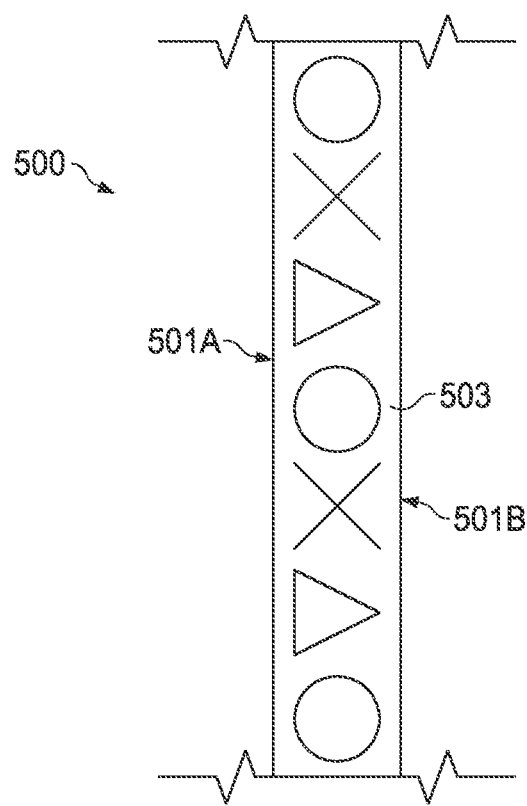
FIGS. 5A, 5B and 5C illustrate aspects of ultrasonic welding between an optical security device and one or more cellulosic surfaces of a substrate formed in an optical security device according to various embodiments of this disclosure.
Figure 5B:
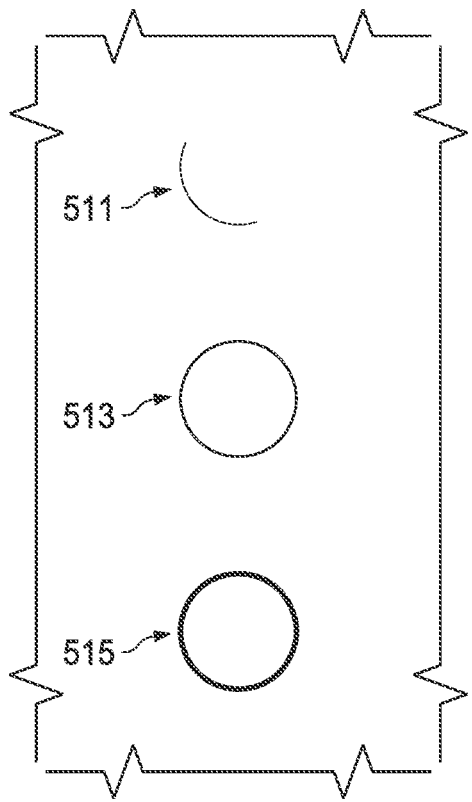
Figure 5C:
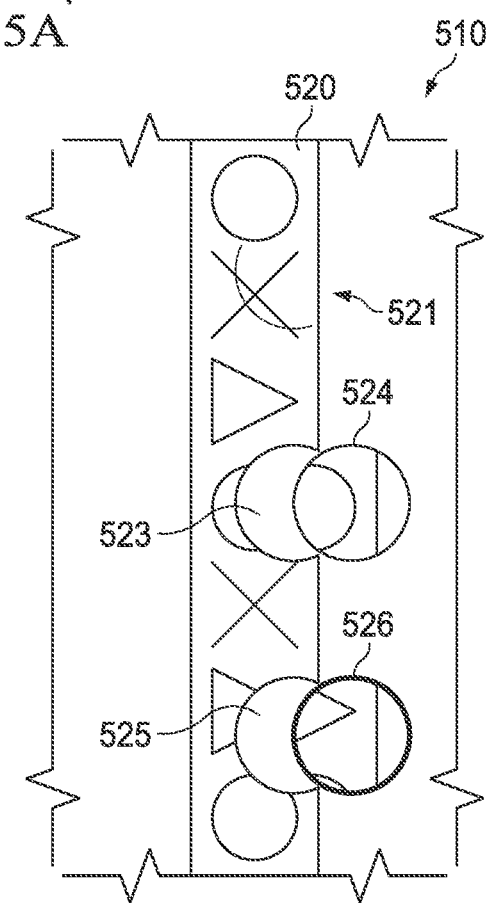

FIGS. 5A, 5B and 5C illustrate aspects of ultrasonic welding between an optical security device and one or more cellulosic surfaces of a substrate according to various embodiments of this disclosure. For convenience, elements common to multiple figures are numbered similarly.

Referring to the non-limiting example of FIG. 5A, an intact section of a surface of an optical security device 500 is depicted in the figure. According to certain embodiments, when incorporated into a security document (for example, security document 200 in FIG. 2A) some or all of the visible portions of optical security device 500 appear as shown in FIG. 5A. Specifically, in some embodiments, the visible portions of optical security device 500 comprise a first unbroken edge 501A and a second unbroken edge 501B, as well as an unbroken image region 503 providing a signature optical effect that, when incorporated into a security document, provides optical indicia of the authenticity of the security document. As alluded to in the discussion of FIG. 1 of this disclosure, for many malicious actors, obtaining as much intact optical security device 500 as possible is a primary goal of their harvesting efforts. As shown by the explanatory examples of FIGS. 5B and 5C, certain embodiments according to this disclosure help prevent malicious actors from realizing this goal by, inter alia, reducing the lengths of intact optical security device 500 available from harvesting.

FIG. 5B provides a surface view of one side of a section of substrate 510 (for example, substrate 350 in FIG. 3) to which a section of optical security device 520 has been ultrasonically welded to an opposite of the substrate. In some embodiments, the section of substrate 510 shown in FIG. 5B corresponds to a portion of substrate in a bridge region (for example, bridge region 223 in FIG. 2A) of an embedded optical security device (for example, as shown in FIG. 2A). In certain embodiments, the section of substrate 510 shown in FIG. 5B corresponds to the underside of a security document to which a security device has been surface mounted (for example, as shown in FIG. 2B) to the opposing side.

Referring to the non-limiting example of FIG. 5B, the surface appearance of sections of substrate 510 overlying an ultrasonic weld formed according to embodiments of this disclosure, can be tuned through adjustments of the predetermined clamping pressure used in the ultrasonic welding process. It should be noted that, the specific poundage of the clamping pressure associated with a particular surface appearance on a section of substrate overlying an ultrasonic weld can depend on a wide variety of variables, including, without limitation, the thickness of the overlying section of substrate, the thickness of the optical security device, and the surface area and shape of the welding mold (for example, mold 410 in FIG. 4). According to some embodiments, where a lower predetermined clamping pressure is utilized (in some embodiments, a clamping pressure of ~10 p.s.i.) the area of substrate 511 immediately overlying the ultrasonic weld exhibits little, if any deformation from the ultrasonic welding process. In various embodiments according to this disclosure, where an intermediate clamping pressure (in certain embodiments, ~20 p.s.i.) is applied during the welding process, the area of substrate 513 immediately overlying the ultrasonic weld exhibits moderate surface deflection. According to various embodiments, the surface deflection is a function of the pattern height of the welding mold. In certain embodiments according to this disclosure, where a heavy clamping pressure (~30 p.s.i., according to various embodiments of this disclosure), the area of substrate immediately overlying the ultrasonic weld exhibits, significant (by security document standards) deflection (for example, deflection greater than or equal to the thickness of optical security device 520) relative to the surrounding areas of substrate 510.

FIG. 5C provides a counterpart view to FIG. 5B, illustrating a view of an opposite side of section of substrate 510, showing optical security device 520 in the regions associated with the ultrasonic welds performed at different clamping pressure in the non-limiting example of FIG. 5B. As shown in the non-limiting example of FIG. 5C, in some embodiments where a lower predetermined clamping pressure is used, a surface contour of optical security device 520 is deformed in an area 521 of optical security device 520 immediately overlying the ultrasonic weld. However, in this illustrative example, the ultrasonic weld remains confined to a single surface of optical security device 520. According to certain embodiments, the "denting" or single-sided deformation of a portion of optical security device 520 in area 521 can be advantageously employed to provide tactile features (for example, braille lettering or patterns of shapes) in a security document.

According to certain embodiments, at an intermediate clamping pressure, the area 523 of optical security device 520 proximate to the ultrasonic weld becomes visibly altered, such that it appears different from, or no longer functions like, an intact section of optical security device 500. Depending on the shape of the mold used, the alteration of optical security device appears as a "punched ticket" effect, wherein a previously contiguous border (for example, second unbroken edge 501B in FIG. 5A) is broken. In certain embodiments, the clamping action may leave a "hanging chad" 524 of material in the area around the ultrasonic weld. In such embodiments, the ultrasonic weld may be said to extend to a second surface of the optical security device, in that the effects of the welding process are visible on a side of optical security device 520 away from the weld at the interface between optical security device and section of substrate 510. According to various embodiments, the aforementioned "punched ticket" and "hanging chad" effects created by increasing the clamping pressure can be hidden from the viewing surface of a security document (for example, in a bridge region), and at the same time, advantageously reduce the amount of optical security device 520, which if successfully harvested, is suitable for malicious reuse.

As shown in the illustrative example of FIG. 5C, the "punched ticket" or "hanging chad" effects shown in area 523 can be amplified (for example, to further guarantee that less of optical security device 520 is suitable for recycling in counterfeit security documents) by increasing the clamping pressure during ultrasonic welding According to various embodiments, by applying a heavier clamping pressure, the area 525 of the optical security device proximate to the ultrasonic weld, portions 526 of optical security device 520 can be loosened or fully separated from the rest of optical security device 520, thereby denying counterfeiters an opportunity to attempt to repair optical security device 520 to appear intact.

As discussed elsewhere in this disclosure, in addition to providing a mechanism for strengthening the bond between an optical security device and a cellulosic surface of a substrate, and making portions of an optical security device less suitable for reuse, ultrasonic welding of an optical security device according to certain embodiments of this disclosure can also enhance the functionality of security documents by providing tactile indicia to complement the visual features of the security document.

FIGS. 6A-6C illustrate examples of tactile features formed in optical security devices by ultrasonic welding according to certain embodiments of this disclosure.

Referring to the non-limiting example of FIG. 6A, an illustration of a section of an optical security device 600 (for example, optical security device 300 in FIG. 3) as it appears following ultrasonic welding to a cellulosic surface is provided in the figure. In this non-limiting example, two areas (601a and 601b) of optical security device 600 comprising raised portions of the surface of optical security device 600 proximate to ultrasonic welds to a cellulosic surface formed according to certain embodiments of this disclosure are depicted in the figure.

Referring to the illustrative example of FIG. 6A, by pinching optical security device 600 and a cellulosic surface of a substrate between a mold and an ultrasonic probe while applying vibrational energy to form an ultrasonic weld, raised patterned forms based on the shape of the mold can be formed in optical security device. Depending on the placement of the ultrasonic weld and the mold(s) used, these raised patterned forms can provide tactile indicia of the identity (for example, a denomination of a currency note) or authenticity of a security document. According to certain embodiments, and as shown in area 601a, raised features created during ultrasonic welding comprise one or more alphanumeric characters, such as the number "100." Depending on embodiments, tactile features formed through ultrasonic welding may be of a scale (for example, on the order of 50-100 microns) such that the feature feels like a single "bump" or "dot" to the touch, but when viewed under magnification, appears as a number or patterned feature. In some embodiments, creating such micro-level detail provides further indicia of the security document's authenticity and a technical challenge to would-be counterfeiters. In some embodiments, and as shown in area 601b, raised features created during ultrasonic welding are spaced and formed to provide distinct features which can be resolved by a user's touch, such as braille lettering.

FIG. 6B illustrates an example of tactile features provided on a surface of an optical security device 610 (for example, optical security device 300 in FIG. 3) during ultrasonic welding to a cellulosic surface, according to various embodiments of this disclosure. According to certain embodiments, optical security device 610 comprises microstructures (for example, microlenses, diffraction gratings, or other similarly-scaled structures) which produce a signature optical effect. Given the size and precise positioning of such microstructures, ultrasonic welding of an optical security device to a cellulosic surface according to some embodiments of this disclosure can damage or disrupt the appearance of the signature optical effect in areas around the ultrasonic weld. In some embodiments (for example, embodiments where the ultrasonic weld is formed in a bridge region of a security document), such damage may be advantageous, in that it reduces a length of potentially reusable sections of optical security device. In some embodiments, the design parameters of the security document (for example, where ultrasonic welds are to be provided in regions of the security document where optical security device 610 is mounted to the surface) may be such that it is undesirable for the microstructures supporting the optical effect to be visibly damaged by an ultrasonic weld.

Referring to the non-limiting example of FIG. 6B, the visible surface of optical security device 610 comprises one or more effect regions (for example, effect region 615) and one or more transition regions (for example, transition region 620). According to various embodiments, effect region 615 comprises an area within optical security device 610 comprising microstructures (for example, array of focusing elements 305 in FIG. 3) which contribute to the provision of a signature optical effect. In certain embodiments according to this disclosure, transition region 620 comprises a section of optical security device 610 in which the microstructures are not provided, or alternatively, in a section of optical security device 610 in which microstructures are present, but project white space in the design of the optical security device, and thus the optical effect provided by optical security device 610 is not detectably damaged during the ultrasonic welding process. According to some embodiments, transition region 620 is composed of an optical spacer (for example, optical spacer 310 in FIG. 3) which is ultrasonically welded to a cellulosic surface. In certain embodiments, in addition to ultrasonic welds, optical security device 610 is affixed to the cellulosic surface using an adhesive, such as an acrylate, a thermoplastic or thermoset adhesive. According to certain embodiments, ultrasonic welds are formed in transition region 620, creating tactile features (for example, tactile feature 625), in one or more shapes, including, without limitation, bars, dots, circles and patterns thereof. FIG. 6C provides a further, illustrative example of a raised tactile feature 630, formed in a transition region 635 of an optical security device, according to some embodiments of this disclosure.

While FIGS. 6A through 6C illustrate examples of tactile features created by ultrasonic welding which are raised relative to a viewing surface of an optical security device, embodiments according to this disclosure are not so limited, and encompass tactile features which are lowered relative to the viewing surface of the optical security device (for example, dents or depressions in the surface of the optical security device).

Figure 7:
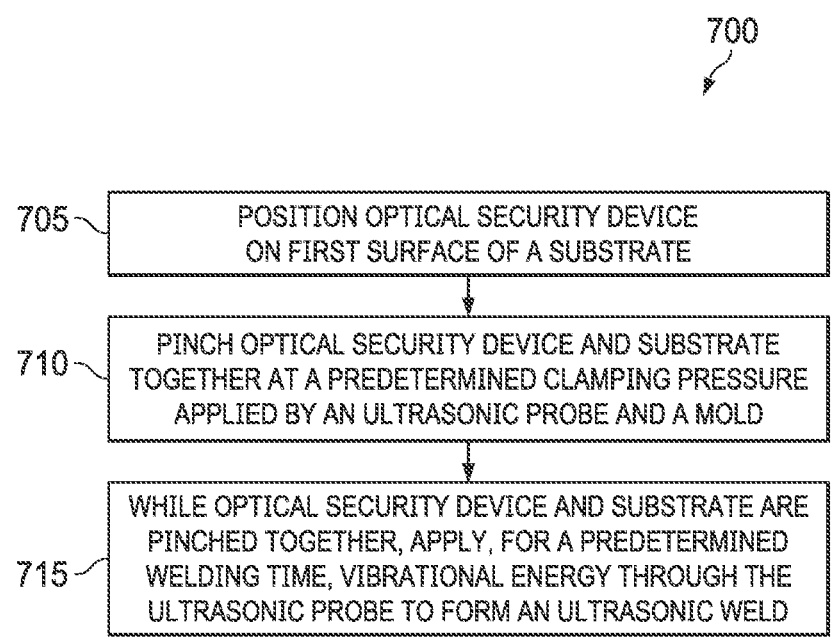
FIG. 7 illustrates operations of a method for making a security document according to various embodiments of this disclosure.

FIG. 7 illustrates operations of a method 700 for making a security document according to various embodiments of this disclosure.

Referring to the non-limiting example of FIG. 7, at operation 705, an optical security device (for example, optical security device 500 in FIG. 5A), or a section thereof, is positioned on a first surface of a substrate. In some embodiments, the first surface of the substrate comprises a cellulosic material, such as wood pulp or cotton fiber. According to some embodiments, the first surface of the substrate may be an exterior surface of a substrate (e.g., a site for surface mounting of the optical security device, or an internal surface of the substrate, such as provided by a bridge region (for example, bridge region 223 in FIG. 2A). In some embodiments, the optical security device is positioned by a station within a larger apparatus for performing a roll-to-roll process for manufacturing security documents, such as, for example, a papermaking machine or a printing machine (for example, an OPTINOTA® machine). In some embodiments, the optical security device is positioned at the wet end of a paper machine, and held in place with an adhesive as the substrate is formed, and then subsequently ultrasonically welded. In certain embodiments, the optical security device is positioned on the substrate at the dry end of a paper machine.

As shown in the illustrative example of FIG. 7, at operation 710, once positioned, the optical security device and the substrate are pinched together at a predetermined clamping pressure, the predetermined clamping pressure applied by an ultrasonic probe (for example, ultrasonic probe 405 in FIG. 4A) and a mold (for example, mold 410 in FIG. 4A). In certain embodiments according to this disclosure, the mold has one or more features (for example, feature 419), which localize the contact pressure to create tactile structures (for example, the braille lettering in area 601b in FIG. 6A) in one or more of the substrate or optical security device proximate to an ultrasonic weld. According to some embodiments, the predetermined clamping pressure is selected to produce visible alterations in an area (for example, area 525 in FIG. 5C) proximate to ultrasonic weld. In some embodiments, the optical security device is clamped in a transition region (for example, transition region 620 in FIG. 6B) to avoid altering a signature visual effect produced by microstructures in the optical security device.

Referring to the non-limiting example of FIG. 7, at operation 715, while the optical security device and the substrate are pinched together, vibrational energy is applied through the ultrasonic probe for a predetermined time to form an ultrasonic weld. In some embodiments according to this disclosure, the predetermined time is greater than 0.25 seconds. In various embodiments, the predetermined welding time is 0.25 seconds or less. In at least one embodiment according to this disclosure, the predetermined welding time is 0.15 seconds or less. In various embodiments according to this disclosure, the predetermined welding time is 0.1 seconds or less.

Examples of security documents according to certain embodiments of this disclosure include security documents comprising a substrate comprising a first surface and a second surface opposite to the first surface, the first surface comprising a cellulosic material; an optical security device comprising optical indicia of authenticity of the security document and a third surface, the third surface comprising a thermoplastic polymer, and an ultrasonic weld forming a bond between a section of the first surface and a section of the third surface.

Examples of security documents according to certain embodiments of this disclosure include security documents wherein the cellulosic material comprises at least one of wood pulp, cotton fiber, linen fiber, flax fiber, sisal fiber, hemp fiber, Abaca fiber, Kozo fiber, Mitsumata fiber, bamboo fiber or Kenaf fiber.

Examples of security documents according to certain embodiments of this disclosure include security documents, wherein the thermoplastic polymer comprises at least one of a polyester, a polyethylene terephthalate (PET), a polypropylene, a polyethylene, or a nylon.

Examples of security documents according to certain embodiments of this disclosure include security documents, wherein the ultrasonic weld contacts the second surface of the substrate.

Examples of security documents according to certain embodiments of this disclosure include security documents, further comprising a window region; and a bridge region, wherein a first portion of the optical security device is embedded within the bridge region, wherein the ultrasonic weld is disposed in the bridge region, and wherein a second portion of the optical security device is visible in the window region.

Examples of security documents according to certain embodiments of this disclosure include security documents, wherein the optical indicia of authenticity is damaged in a region of the optical security device proximate to the ultrasonic weld.

Examples of security documents according to certain embodiments of this disclosure include security documents, wherein the optical security device is a micro-optic security device comprising a layer of focusing elements and a layer of image icon elements.

Examples of security documents according to certain embodiments of this disclosure include security documents, wherein the optical security device is surface mounted to the first surface of the substrate.

Examples of security documents according to certain embodiments of this disclosure include security documents, wherein the optical security device is a micro-optic security device comprising an effect region, the effect region comprising a layer of focusing elements and a layer of image icon elements, wherein the optical security device comprises a transition region, and wherein the ultrasonic weld is disposed in the transition region.

Examples of security documents according to certain embodiments of this disclosure include security documents further comprising a raised portion comprising the ultrasonic weld.

Examples of security documents according to certain embodiments of this disclosure include security documents wherein the raised portion comprises a tactile indicia of authenticity of the security document.

Examples of security documents according to certain embodiments of this disclosure include security documents wherein the tactile indicia of authenticity comprises at least one of a bar, a dot, a solid circle, a solid pattern, an alphanumeric character, or a braille character.

Examples of security documents according to certain embodiments of this disclosure include security documents wherein the optical security device comprises a machine-readable security feature.

Examples of security documents according to certain embodiments of this disclosure include security documents wherein the third surface is coated with one or more of an acrylate, a thermoplastic or thermoset adhesive.

Examples of methods of making security documents according to certain embodiments of this disclosure include methods comprising positioning an optical security device on a first surface of a substrate, wherein the substrate comprises the first surface and a second surface opposite to the first surface, the first surface comprises a cellulosic material, and the optical security device comprises optical indicia of authenticity of the security document and a third surface, the third surface comprising a thermoplastic polymer; pinching the optical security device and the substrate together at a predetermined clamping pressure applied by an ultrasonic probe and a mold; and while the optical security device and substrate are pinched together, applying for a predetermined welding time, vibrational energy through the ultrasonic probe to produce an ultrasonic weld bonding a section of the first surface to a section of the third surface.

Examples of methods of making security documents according to certain embodiments of this disclosure include methods wherein the optical security device is positioned on the first surface of the substrate at a wet end of a paper making machine.

Examples of methods of making security documents according to certain embodiments of this disclosure include methods wherein the optical security device is positioned on the first surface of the substrate at a dry end of a paper making machine.

Examples of methods of making security documents according to certain embodiments of this disclosure include methods wherein the vibrational energy is applied at a dry end of a paper making machine.

Examples of methods of making security documents according to certain embodiments of this disclosure include methods wherein the vibrational energy is applied in a printing press.

Examples of methods of making security documents according to certain embodiments of this disclosure include methods wherein positioning the optical security device on the first surface of the substrate is performed as part of a roll-to-roll manufacturing process.

Examples of methods of making security documents according to certain embodiments of this disclosure include methods wherein pinching the optical security device and the substrate together at a predetermined clamping pressure is performed as part of a roll-to-roll manufacturing process.

Examples of methods of making security documents according to certain embodiments of this disclosure include methods wherein applying vibrational energy through the ultrasonic probe to produce an ultrasonic weld bonding a portion of the first surface to a portion of the third surface is performed as part of a roll-to-roll manufacturing process.

Examples of methods of making security documents according to certain embodiments of this disclosure include methods wherein the predetermined clamping pressure is less than 30 pounds per square inch (psi).

Examples of methods of making security documents according to certain embodiments of this disclosure include methods wherein the predetermined clamping pressure is less than 20 psi.

Examples of methods of making security documents according to certain embodiments of this disclosure include methods wherein the predetermined clamping pressure is less than 10 psi.

Examples of methods of making security documents according to certain embodiments of this disclosure include methods wherein the predetermined welding time is greater than 0.25 seconds.

Examples of methods of making security documents according to certain embodiments of this disclosure include methods wherein the predetermined welding time is 0.25 seconds or less.

Examples of methods of making security documents according to certain embodiments of this disclosure include methods wherein the predetermined welding time is 0.15 seconds or less.

Examples of methods of making security documents according to certain embodiments of this disclosure include methods wherein the predetermined welding time is 0.1 seconds or less.

Examples of methods of making security documents according to certain embodiments of this disclosure include methods wherein the cellulosic material comprises at least one of wood pulp, cotton fiber, linen fiber, flax fiber, sisal fiber, hemp fiber, Abaca fiber, Kozo fiber, Mitsumata fiber, bamboo fiber or Kenaf fiber.

Examples of methods of making security documents according to certain embodiments of this disclosure include methods wherein the thermoplastic polymer comprises at least one of a polyester, a polyethylene terephthalate (PET), a polypropylene, a polyethylene, or a nylon.

Examples of methods of making security documents according to certain embodiments of this disclosure include methods wherein the ultrasonic weld contacts the second surface of the substrate.

Examples of methods of making security documents according to certain embodiments of this disclosure include methods wherein the optical security device is positioned on the first surface of the substrate in a manner defining a window region and a bridge region, wherein a first portion of the optical security device is embedded within the bridge region, wherein the ultrasonic weld is disposed in the bridge region, and wherein a second portion of the optical security device is visible in the window region.

Examples of methods of making security documents according to certain embodiments of this disclosure include methods wherein pinching the optical security device and the substrate together at a predetermined clamping pressure damages the optical indicia of authenticity in a region of the optical security device proximate to the ultrasonic weld.

Examples of methods of making security documents according to certain embodiments of this disclosure include methods wherein the optical security device is a micro-optic security device comprising a layer of focusing elements and a layer of image icon elements.

Examples of methods of making security documents according to certain embodiments of this disclosure include methods wherein positioning the optical security device on the first surface of the substrate comprises surface mounting the optical security device to the first surface of the substrate.

Examples of methods of making security documents according to certain embodiments of this disclosure include methods wherein the optical security device is a micro-optic security device comprising an effect region, the effect region comprising a layer of focusing elements and a layer of image icon elements, wherein the optical security device comprises a transition region, and wherein the ultrasonic weld is disposed in the transition region.

Examples of methods of making security documents according to certain embodiments of this disclosure include methods wherein pinching the optical security device and the substrate together and applying vibrational energy to produce an ultrasonic weld forms a raised portion comprising the ultrasonic weld.

Examples of methods of making security documents according to certain embodiments of this disclosure include methods wherein the raised portion comprises a tactile indicia of authenticity of the security document.

Examples of methods of making security documents according to certain embodiments of this disclosure include methods wherein the tactile indicia of authenticity comprises at least one of a bar, a dot, an alphanumeric character, a solid pattern or a braille character.

Examples of methods of making security documents according to certain embodiments of this disclosure include methods wherein the optical security device comprises a machine-readable security feature.

Examples of methods of making security documents according to certain embodiments of this disclosure include methods wherein pinching the optical security device and the substrate together at a predetermined clamping pressure applied by an ultrasonic probe and a mold and applying for a predetermined welding time, vibrational energy through the ultrasonic probe to produce an ultrasonic weld bonding a section of the first surface to a section of the third surface are performed as part of a printing process.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. A security document, comprising:
   a substrate comprising a first surface and a second surface opposite to the first surface, the first surface comprising a cellulosic material;
   an optical security device comprising:
      optical indicia of authenticity of the security document, and
      a third surface, the third surface comprising a thermoplastic polymer; and
   an ultrasonic weld forming a bond between a section of the first surface and a section of the third surface,
   wherein a first portion of the optical security device is embedded in the substrate, forming a bridge region,
   wherein a second portion of the optical security device is visibly disposed on the first surface, forming a window region, and
   wherein the ultrasonic weld is disposed only in the bridge region.

2. The security document of claim 1, wherein the ultrasonic weld contacts the second surface of the substrate.

3. The security document of claim 1, wherein the optical indicia of authenticity is damaged in the bridge region and proximate to the ultrasonic weld.

4. The security document of claim 1, wherein the optical security device is a micro-optic security device comprising a layer of focusing elements and a layer of image icon elements.

5. The security document of claim 1, wherein the optical security device comprises:
   an effect region, the effect region comprising a layer of focusing elements and a layer of image icon elements; and
   a transition region,
   wherein the ultrasonic weld is disposed in the transition region.

6. The security document of claim 1, wherein the optical indicia of authenticity is not damaged in the window region by the ultrasonic weld.

7. A security document, comprising:
   a substrate comprising a first surface and a second surface opposite to the first surface, the first surface comprising a cellulosic material;
   an optical security device configured as a thin continuous strip, the thin continuous strip woven into the substrate to form a window region and a bridge region, the optical security device comprising:
      a first layer including at least one micro-scale structure providing optical indicia of authenticity of the security document, and
      a third surface comprising a thermoplastic polymer; and
   an ultrasonic weld disposed only in the bridge region and forming a bond between a section of the cellulosic material of the first surface and a section of the thermoplastic polymer of the third surface.

8. The security document of claim 7, wherein the third surface is:
   a seal layer of the at least one micro-scale structure;
   a layer of focusing elements;
   an image icon layer; or
   a substrate which the at least one micro-scale structure is disposed on.

9. The security document of claim 7, wherein the ultrasonic weld deforms or separates a portion of the optical security device to render the optical security device unfit for re-use.

* * * * *